(12) United States Patent
Harris et al.

(10) Patent No.: US 9,167,417 B2
(45) Date of Patent: *Oct. 20, 2015

(54) APPLICATION BASED NETWORK INFORMATION MAINTENANCE

(71) Applicant: NOKIA SOLUTIONS AND NETWORKS OY, Espoo (FI)

(72) Inventors: John Harris, Glenview, IL (US); Umamaheswar Kakinada, Carpentersville, IL (US); Ronald Crocker, St. Charles, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/054,287

(22) Filed: Oct. 15, 2013

(65) Prior Publication Data

US 2014/0342716 A1  Nov. 20, 2014

Related U.S. Application Data

(63) Continuation-in-part of application No. 13/897,046, filed on May 17, 2013.

(51) Int. Cl.
*H04M 3/42* (2006.01)
*H04W 8/22* (2009.01)
*H04W 4/12* (2009.01)
(Continued)

(52) U.S. Cl.
CPC ............. *H04W 8/22* (2013.01); *H04L 67/26* (2013.01); *H04W 4/001* (2013.01); *H04W 4/12* (2013.01)

(58) Field of Classification Search
CPC ........... H04L 67/26; H04W 4/12; H04W 8/22
USPC ................. 455/412.2, 418, 420, 466, 422.1; 370/328–332, 338
See application file for complete search history.

(56) References Cited

U.S. PATENT DOCUMENTS 6,021,122 A     2/2000  Tiedemann, Jr.
2005/0071476 A1*  3/2005  Tejaswini et al. ............. 709/227
(Continued)

FOREIGN PATENT DOCUMENTS

EP       1 853 045 A1    11/2007

OTHER PUBLICATIONS

International Search Report and Written Opinion dated May 13, 2014, issued in corresponding PCT/EP2014/056778, 11 pages.

(Continued)

*Primary Examiner* — Babar Sarwar
(74) *Attorney, Agent, or Firm* — Squire Patton Boggs (US) LLP

(57) ABSTRACT

Various communication systems may benefit from notifications of network information. For example, cellular optimization may be accomplished by selective use of a data technique by applications on network devices, which may further benefit from notifications that may reduce the need for external data requests, used in coordination with application observations of current network conditions. According to certain embodiments, a method can include monitoring network service viability for a user or application. The method can also include sending a push message to a user equipment when network service viability is detected for the user or the application. The push message can indicate at least one threshold associated with network service viability.

15 Claims, 13 Drawing Sheets

(51) Int. Cl.
*H04L 29/08* (2006.01)
*H04W 4/00* (2009.01)

(56) References Cited

U.S. PATENT DOCUMENTS

| | | |
|---|---|---|
| 2007/0169001 A1 | 7/2007 | Raghunath et al. |
| 2008/0159232 A1 | 7/2008 | Thalanany et al. |
| 2008/0244040 A1 | 10/2008 | Bhatia et al. |
| 2009/0086643 A1 | 4/2009 | Kotrla et al. |
| 2010/0316066 A1 | 12/2010 | Leung |
| 2011/0274156 A1 | 11/2011 | Mighani et al. |
| 2012/0170451 A1 | 7/2012 | Viswanathan et al. |
| 2012/0173901 A1 | 7/2012 | Soliman et al. |
| 2012/0315879 A1* | 12/2012 | Vrbaski et al. ............ 455/412.1 |
| 2013/0005391 A1 | 1/2013 | Niass et al. |

OTHER PUBLICATIONS

Non-Final Office Action dated Dec. 4, 2014, issued in related U.S. Appl. No. 13/897,046, 13 pages.
International Search Report application No. PCT/EP2014/069760 dated Apr. 29, 2015.

* cited by examiner

APPLICATION BASED NETWORK INFORMATION MAINTENANCE

CROSS REFERENCE TO RELATED APPLICATIONS

This application is a continuation-in-part of U.S. patent application Ser. No. 13/897,046 filed May 17, 2013, which is hereby incorporated herein by reference in its entirety.

BACKGROUND

1. Field

Various communication systems may benefit from notifications of network information. For example, cellular optimization may be accomplished by selective use of a data technique by applications on network devices, which may further benefit from notifications that may reduce the need for external data requests, used in coordination with application observations of current network conditions.

2. Description of the Related Art

A media optimizer in the core network cannot cause certain streaming applications to perform certain adaptations that are solely controlled by the application in the client. This may be true, for example, for adaptation of whether to prefill or only download video just in time where within these protocols the next section of video can only be downloaded when the user equipment (UE) App/application sends a requested uniform resource locator (URL) corresponding to the next section of video. A browsing gateway is one example of a media optimizer. Some media optimizers may sit outside of the evolved packet core (EPC). These approaches may require that the UE have knowledge of radio access network conditions or core network traffic conditions, and these conditions may vary over time.

In current wireless communication systems, wireless network utilization may be, on average, only about 30% during a busy time, meaning that the network is 70% idle. With authorized shared access (ASA) and continuing bursty user traffic patterns, this large amount of idle resources may be targeted for use by various applications.

Wireless traffic of particular interest may be traffic with requirements for high bit rates, low latency, high consistency of coverage, and/or low network utilization for purposes such as prefetching. However, wireless resources may be increasingly intermittent, for example, due to ASA, small cells, real-time video, and very high bit rate services at the edge of loaded cells.

Techniques for identifying coverage holes exist. Additional capacity/coverage can be added, for example, through additional small cells, and in some cases remote electrical tilt of antennas. However, higher bit rate applications may not always be able to function well across the entire wireless system.

A knowledge server architecture may be provided to answer queries regarding network conditions. For example, with a knowledge server architecture, applications may be able to use a uniform resource locator (URL) to query the knowledge server. In response, the knowledge server can provide network insights, involving, for example, whether now is a good time to perform prefetching, for example due to low network utilization or loading and/or likely network limitations.

However, there may be a waste of radio frequency (RF) resources when applications (Apps) are slow to discover newly available resources. On the other hand, it may waste both RF resources and UE battery if an App repeatedly tests or queries a network or server regarding network conditions. Similarly, it may waste a user's time for the user to tap on an application and then wait to see if it will work. Additionally, when an application is slow to discover changed network conditions, then the application may continue with behavior which is no longer appropriate. Examples might include continuing toward an area of a coverage hole, or continuing to prefetch.

Lack of coverage or lack of adequate cellular over the air performance may be an element of customer experience concerns, and customer experience management (CEM). From a consumer perspective, the consumer over an interval of time will typically learn that, in particular locations, calls will consistently drop. For example, for a particular user such locations might include a particular portion of one route to the cafeteria or between home and work. Consequently, this typical user may simply avoid placing calls in these areas, and may endeavor to complete calls prior to entering these areas. Improving wireless coverage/eliminating coverage holes within cellular systems can be a resource intensive process for the operator. For example, one expensive example would be where the operator has deployed an additional small cell.

When the customer service provider or wireless infrastructure provider rectifies a coverage hole, it may do so in order to improve customer experience and/or customer satisfaction. However, for existing customers that are already consistently or habitually avoiding real-time wireless usage in these regions, the customer experience improvement may be greatly diminished or altogether avoided.

SUMMARY

According to certain embodiments, a method can include monitoring network service viability for a user or application. The method can also include sending a push message to a user equipment when network service viability is detected for the user or the application. The push message can indicate at least one threshold associated with network service viability.

A method, according to certain embodiments, can include adjusting functionality of an application of a user equipment or of the user equipment, based on a first network insight received from a network element. The method can also include determining at least one environmental condition corresponding to the user equipment. The method can further include monitoring the at least one environmental condition. The method can additionally include readjusting the functionality of the application or user equipment when the at least one environmental condition meets a predetermined condition.

An apparatus, in certain embodiments, can include at least one processor and at least one memory including computer program code. The at least one memory and the computer program code can be configured to, with the at least one processor, cause the apparatus at least to monitor network service viability for a user or application. The at least one memory and the computer program code can also be configured to, with the at least one processor, cause the apparatus at least to send a push message to an application running on a user equipment when network service viability is detected for the user or the application. The push message can indicate at least one threshold associated with network service viability.

In certain embodiments, an apparatus can include at least one processor and at least one memory including computer program code. The at least one memory and the computer program code can be configured to, with the at least one processor, cause the apparatus at least to adjust functionality of an application of a user equipment or of the user equipment, based on a first network insight received from a network element. The at least one memory and the computer program code can also be configured to, with the at least one processor, cause the apparatus at least to determine at least one environmental condition corresponding to the user equipment. The at least one memory and the computer program code can further be configured to, with the at least one processor, cause the apparatus at least to monitor the at least one environmental condition. The at least one memory and the computer program code can additionally be configured to, with the at least one processor, cause the apparatus at least to readjust the functionality of the application or user equipment when the at least one environmental condition meets a predetermined condition.

According to certain embodiments, an apparatus can include means for monitoring network service viability for a user or application. The apparatus can also include means for sending a push message to a user equipment when network service viability is detected for the user or the application. The push message can indicate at least one threshold associated with network service viability.

An apparatus, according to certain embodiments, can include means for adjusting functionality of an application of a user equipment or of the user equipment, based on a first network insight received from a network element. The apparatus can also include means for determining at least one environmental condition corresponding to the user equipment. The apparatus can further include means for monitoring the at least one environmental condition. The apparatus can additionally include means for readjusting the functionality of the application or user equipment when the at least one environmental condition meets a predetermined condition.

A non-transitory computer-readable medium can, in certain embodiments, be encoded with instructions that, when executed in hardware, perform a process. The process can include monitoring network service viability for a user or application. The process can also include sending a push message to a user equipment when network service viability is detected for the user or the application. The push message can indicate at least one threshold associated with network service viability.

In certain embodiments, a non-transitory computer-readable medium can be encoded with instructions that, when executed in hardware, perform a process. The process can include adjusting functionality of an application of a user equipment or of the user equipment, based on a first network insight received from a network element. The process can also include determining at least one environmental condition corresponding to the user equipment. The process can further include monitoring the at least one environmental condition. The process can additionally include readjusting the functionality of the application or user equipment when the at least one environmental condition meets a predetermined condition

BRIEF DESCRIPTION OF THE DRAWINGS

For proper understanding of the invention, reference should be made to the accompanying drawings, wherein.

DETAILED DESCRIPTION

Figure 1:
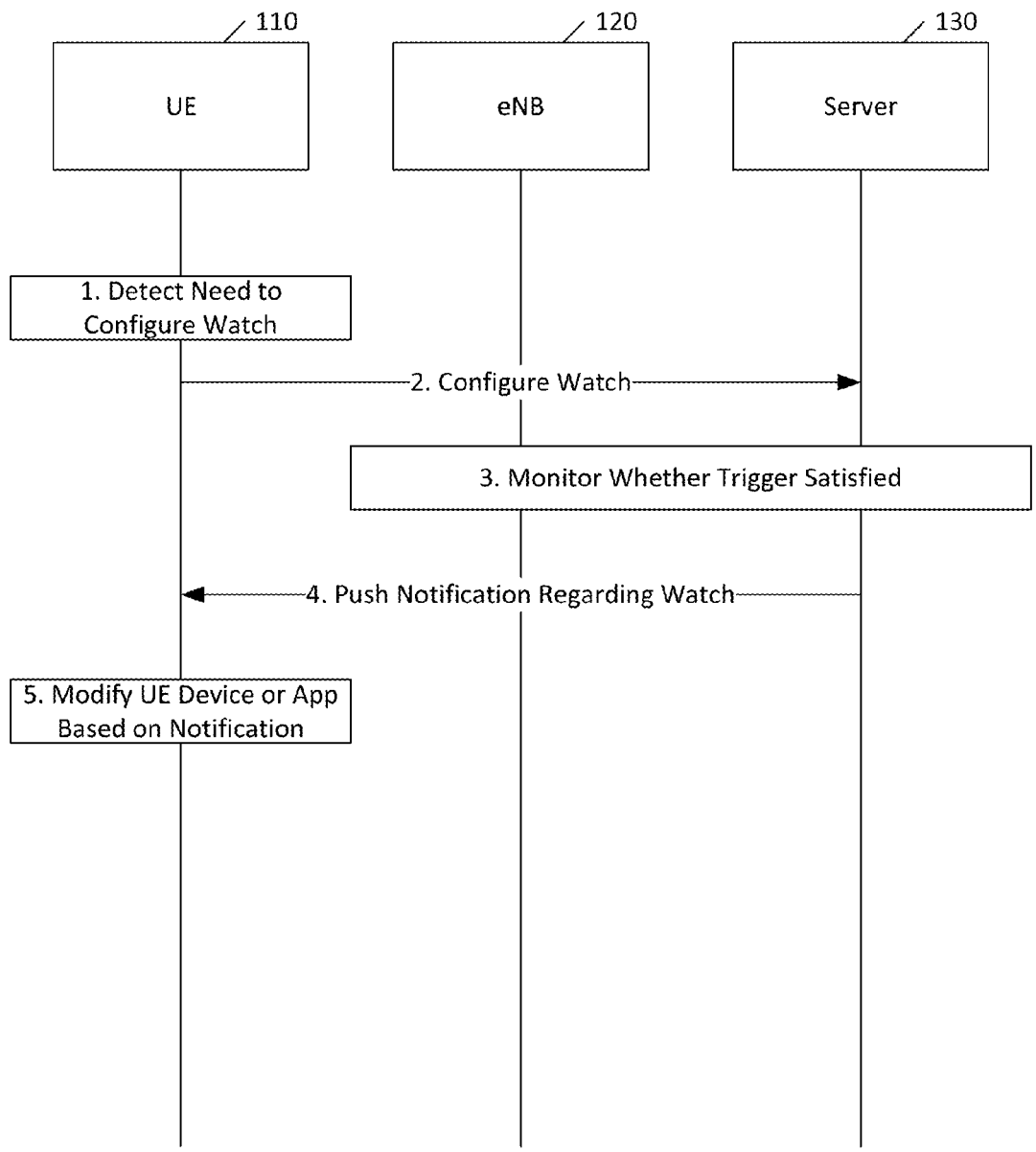
FIG. 1 illustrates a signal flow diagram for a method according to certain embodiments.

Certain embodiments discussed herein may relate to providing a knowledge server (KS) push notification service which may allow a user equipment (UE) subscribe to a KS push notification service for an application level push notification when the wireless conditions reach a particular state. This state or trigger may be one that is immediately relevant to the particular UE's application. For example, the particular UE application may now be in conditions that are appropriate for some particular behavior. This notification can then trigger applications, which had been waiting for idle wireless resources to perform certain reactions.

These reaction use cases may include background prefetching and/or advertising certain high bit rate services to the application (App) and/or user. Additionally, on smart phones this pushed radio frequency (RF) condition update notification may result in a modification of an icon or badge for certain apps/contacts to indicate that those apps/contacts are now "viable."

This push notification service may enable a significant reduction in the amount of battery drain and wireless resources consumed performing possibly periodic knowledge server URL queries, in cases where the knowledge server response may be the same as it was the last time it was queried by the device.

More generally, certain embodiments provide a mechanism to accelerate applications discovering otherwise wasted resources, so that they can strategically use the resources, in order to work around network limitations/congestion. Likewise, certain embodiments provide a mechanism to accelerate applications in discovering that there are sufficient network resources for their high bit rate application, for example, streaming movies, video telephony, prefetching, or the like.

Such demanding applications may have both demands of a wireless system, in terms of high bit rate, radio coverage, and consistency conditions. They may also have requirements such as that the application server is functioning and not overloaded.

There may be cases where additional wireless resources become available, where they were not previously available. In cases where additional wireless resources are now available, but are not being fully used, certain embodiments may provide a way to improve both resource usage and customer experience.

Such an opportunity may present itself after deployment of a small cell, after authorized shared access returns additional spectrum to the communication service providers (CSP), or after other heavy user loading dissipates. Certain embodiments may promote usage and/or awareness as quickly and strategically as possible, when such additional idle and/or unused wireless resources become available and idle. Thus, certain embodiments may not directly address coverage holes themselves, but rather may address rapidly exploiting newly available RF resources, such as those existing in previous coverage holes.

Certain embodiments may significantly magnify or increase the amount of improved customer experience that the operator will provide after having addressed a coverage hole, such as after investing in an additional small cell or other cellular resources to fix a known coverage hole. Furthermore, notifications of this type may be provided as a premium service. For example, such notifications can be provided for premium users identified through customer experience management, or for users which are paying an incremental amount for such wireless experience enhancements. In another embodiment, such messages can be sent to users who have complained about call or video quality in the same geographic region as the improvement. In a further embodiment, such messages can be sent to users who previously queried a knowledge server regarding radio characteristics in a particular area.

Additionally, these notifications may be further prioritized in order to avoid attempting simultaneous notification of numerous UEs in the same region. Thus, a time window can be defined, such as a one second window, a five second window, or a one minute window (other lengths of time are also permitted), and only a highest priority notification can be sent within a given window. Alternatively, only a limited number, for example five, notifications may be sent within a given time window. Whether the notifications are limited may depend on whether the notifications are to be displayed to the user or not. For example, for notifications that are expected to be used automatically by an application, the time window may be more narrowly defined and more restrictive, whereas notifications that are expected to be viewed by the user may be more broadly defined and less restrictive.

Furthermore, these notifications may be prioritized according to a schedule of time intervals and/or locations which was/were configured in the watch. For example, it may be that a notification is most important and/or impactful to the application just before it makes specific decisions. One example is with video where the compression level for the next segment of video may be determined once per segment or once every 10 seconds. In this case the application of the handset may configure the watch to include the knowledge of these specific time intervals where the notification could be particularly impactful. In another embodiment, where the user is selecting a route based on these notifications, it may be that when the user approaches specific intersections where one of two different routes can be selected and there has been a change, then a notification of the change in the wireless conditions along one or the other route is particularly impactful. Consequently, the application enhancer may have configured specific geographic locations in the watch, indicating that if there is a notification corresponding to that watch, and the user enters that particular location, then that notification should be given higher priority. Such a situation may arise when the user is in other locations, for example has just selected one route or the other after passing the aforementioned intersection/location.

Moreover, certain embodiments may avoid providing an alert or messaging users, except where the information is most likely to be useful or important to the subscriber. Thus, the mechanism described herein is not simply that the UE alerts a user or application(s) any time the UE reenters coverage. Similarly, certain embodiments are not directed to push notifications of services, such as connectivity services offered by hotspot and other local area wireless access points.

Thus, certain embodiments may provide a technique for increasing the amount of customer experience improvement realized resulting from an improvement in coverage in a geographic region with previously established history of poor coverage/service for that user. Moreover, certain embodiments relate to a technique for increasing customer experience improvement in which a first network element, for example a customer experience management (CEM) entity can perform a process. The process can include the network creating a network service viability watch for at least a first user and/or application (App). The process can also include performing messaging to monitor the user's wireless service viability conditions. Upon detection that network service viability watch for the user has been satisfied, the network can initiate an application level push notification to the corresponding App/user.

The push notification can trigger at least one of the application beginning to transfer background traffic or modification of a badge, a smart phone App icon, or a contact Icon An App on the user's device can create the service viability watch. Alternatively, the network can create a watch. For example, if a user pattern matches predetermined criteria, a watch can be created.

The watch can include radio conditions such as required bit rate, delay, utilization, or the like. The watch can also include specific locations. Moreover, the watch can focus on radio conditions for specific locations on a location-by-location basis.

The network element can inform the wireless network of currently pending service viability watches. In consequence, the wireless network can perform stricter admission control. For example, the stricter admission control can be in response to detection of more than a threshold amount of additional, for example high value, watches being established. In another embodiment, the network may preferentially cause the user with a configured watch to remain in a relatively connected state such that the network can more accurately monitor the users RF conditions, for the purpose of better monitoring the configured network condition watch. This embodiment may be more relevant for the case where the user is not performing application traffic during the time interval covered by the watch.

The messaging to monitor the user's wireless conditions can be messaging to the wireless network element, such as unicast messaging. Alternatively, or in addition, the messaging can include messaging to a group of other wireless users currently using the wireless network.

The network element can be a CEM server, a knowledge server, or a push notification server. The network element can continuously monitor the user's area radio conditions. For example, the monitoring can be based on radio frequency (RF) messaging such as radio resource control (RRC) messaging, handoff and/or handover messaging, tracking area updates (TAUs), location area updates (LAUs), reporting area updates (RAUs), and radio quality reports, such as channel quality indicator (CQI), reference signal received quality (RSRQ), reference signal received power (RSRP), or other measurement report messaging. The monitoring can also include operations and maintenance (O&M) messaging from an evolved Node B (eNB) corresponding to an area of interest, such as the area that the user equipment (UE) currently resides.

In order to determine when to autonomously trigger the described push notifications upon reaching the configured watch criteria, various criteria can be used. For example, the network or device or App on the device can automatically create a service viability watch upon detection of an event.

The event may be, for example, that the UE has traversed a particular geographic region more than a threshold amount. Such a criterion may imply that the user is a commuter who may be self-trained not to place calls in the geographic region, based on prior lack of success in placing calls in that region. In other words, the user may be aware from the user's own experience or from reports from other users that there were coverage holes in a particular region. The criteria may, therefore, include that the particular UE has not successfully placed any calls, or other real time communications such as video chat, within this geographic region.

Additionally, the UE may configure multiple simultaneous watches. In such cases, the notification may include an index indicating which watch has been satisfied, for example for the case where the application is considering two different possible navigational routes. Furthermore, in another embodiment, the watch may be configured to monitor for the relative network conditions between two different locations or navigational routes. For example, the watch may be configured to perform notification if the relative goodness of the network conditions on one route relative to the other route changes more than a threshold amount.

Furthermore, the App's configuration of the watch may further indicate/place requirements on the time interval associated with the watch, such as how long or consistent the network conditions are expected to be. After coverage improvement has occurred, a push message can be sent to the user equipment to inform the user of the improved radio conditions in the area, for example, subsequent to the coverage improvement. Alternatively, the push notification may inform the user or user equipment of an expected duration of coverage difficulty in a particular area, to set a user's expectations regarding a horizon for the coverage hole.

Another event that can lead to the creation of a watch is a UE/App initiated service. For example, the event can be that the UE/App initiated service failed, for example due to a network or App server error. The watch may also take into account the location of the event and/or a threshold time interval of how recent the event is. For example, several failures within a short time interval may trigger the watch. The event can be detected in terms of an upcoming context, such as location, time of day, time of week, or the like. Moreover, the push message can be timed to correspond to the timing or location of the event. For example, if the user experienced trouble during a morning commuting time, the push message can be sent during a morning commuting time. Similarly, if the user experienced trouble at a train station, the push message can be sent the next time the user is at the same train station. Furthermore, the watch configured may correspond to a series of locations, where each location is associated with a subsequent future time interval, such that the watch is configured to correspond to the user's planned primary or alternate navigational route.

Another event that can lead to the creation of a watch is detection that in a particular geographic region there has been a significant increase in coverage/wireless service quality. For example, the network element may detect that in this first geographic region coverage was previously consistently worse than a threshold, but is now consistently better than the threshold.

A network element can trigger knowledge server (KS) push messaging to the UE/subscriber upon detection of the service viability watch being satisfied. Messaging to the user can be automatically avoided if network detects successful calls with that user within the first geographic region, wherein calls were previously consistently unsuccessful in that first geographic region. In other words, the sending of the push messaging can be conditioned on the network determining that the push message would be informative to the user. If the user already knows that there is coverage, then, there is no need to send the message.

For example, in a particular embodiment, a server can detect that in a first geographic region a significant increase in coverage/wireless service quality has been achieved. Moreover, the server can detect that in this first geographic region, coverage was previously consistently worse than a threshold. Moreover, the server can identify at least one UE that satisfies the following conditions. For example, the conditions can include that the UE has traversed this first geographic region more than a threshold amount. Thus, the user of the UE may be a commuter who has potentially self-trained not to place calls or engage in other real-time communication in this geographic region. The conditions can also include that the UE has not placed any calls, or other real time communications, within this first geographic region. In other words, the UE has not successfully done so, and/or has not done so subsequent to the coverage improvement. In response to a network element detecting such a UE, the network element can trigger messaging to the UE/subscriber indicating that there is newly enhanced/expanded network coverage/quality in this first geographic area.

Messaging can be restricted in various ways. For example, the messaging can be restricted to subscribers that previously passed through a particular geographic region more than a threshold amount, prior to the coverage improvement. Alternatively, or in addition, the messaging can be restricted to subscribers that typically place more than a threshold amount of calls/real-time communications, implying that the omission of any calls in this area a likely indicator of the relevance of such messaging to the subscriber.

Another option is that messaging can be restricted to subscribers that terminate calls just prior to entering the first geographic region. Such action may imply that the subscriber was hurrying to terminate the call just prior to entering the first geographic region, which now has new coverage. For example, a tunnel may previously have had no coverage, but may now have coverage. In such a circumstance, users may terminate calls because of fear of losing the call in the tunnel. However, if users were aware of continued coverage in the tunnel, they could maintain their calls or place new calls while in the tunnel.

In another option, messaging can be restricted to subscribers that initiate calls just after exiting the first geographic region. Such behavior may imply that the subscribers were waiting until they exited the first geographic region before placing calls. Likewise, in an option, messaging can be restricted to subscribers that consistently navigate around an area of poor wireless coverage area. In particular, it may be considered whether they do so while engaged in calls/real-time wireless communication, instead of choosing a path through the first geographic region, which would appear to provide a shorter/more direct route. For example, historical data regarding the subscribers may be considered to determine whether their paths selected more likely depend on their need for coverage. Such subscribers may then receive messaging regarding an area of improved coverage.

Notifications of this type may be provided as a premium service. For example, such notifications may be sent only to premium users identified through customer experience management, or for users which are paying an incremental amount for such wireless experience enhancements.

Detecting the improvement in coverage in a first geographic region can be done in a variety of ways. For example, a communication element within the wireless infrastructure, such as an evolved Node B, can perform the detection. Alternatively, or in addition, an application running on the UE or subscriber device can perform the detection. In another option, an application running on the Internet can perform the detection, even if the application is on a remote server.

A notification can be triggered when a network element detects successful calls within a first geographic region, wherein calls were previously consistently unsuccessful in that first geographic region. The network element can incorporate information from an operations and maintenance (O&M) system. Such information can include, for example, that an additional cell was deployed covering the geographic region. The information can further be based on input from a remote electrical tilt (RET) system indicating that a remote electrical antenna tilt was performed. Such a new tilt may provided coverage in the geographic region, which was previously consistently absent.

The method described herein can be implemented within a network customer experience management system. The messaging, in such a case, may be achieved, for example over text messages to the user.

Alternatively, a UE application can detects the pattern(s) as described above and then can directly perform messaging to the subscriber. This may, for example, be part of an application downloaded onto a smart phone or part of an operating system of the UE.

An application and/or service provider, such a mapping and directions service, can provide a service by detecting the change and then performing the notification. Moreover, the mapping service can provide notifications both of areas where currently many calls are being terminated, and areas where such conditions formerly existed but no longer existed. Thus, for example, if a mapping service monitors user behavior in correlation to geography, the mapping service may be aware of coverage holes and may likewise be able to detect when a previous coverage hole is no longer present.

FIG. 1 illustrates a signal flow diagram for a method according to certain embodiments. As shown in FIG. 1, at 1 a user equipment 110 can detect a need to configure a watch. The need can be, for example, based on the user considering taking a different route to work. For example, an application could create a watch, resulting in a push notification if network traffic congestion reduces on some alternate vehicle route which is shorter but previously had worse coverage.

At 2, the user equipment or an application thereof can configure a watch by sending a message to eNB 120 and/or server 130. Then, at 3, the server 130 and/or the eNB 120 can monitor to determine whether a trigger for the watch is satisfied. The server 130 here can be a knowledge server. The trigger maybe satisfied, for example, due to a change in cell loading along a predetermined route.

When the trigger is met, at 4, the server 130 and/or the eNB 120 can send a push notification to user equipment 110. An application on user equipment 110 can then create an alert or a change of a badge or icon on the user equipment 110, to alert the user regarding the changed conditions. In another embodiment, an application on user equipment 110 application may close the session associated with an ongoing file transfer in order to reduce the amount of loading on the cellular network, for example causing a TCP FIN message to be transmitted to the application server, causing the in progress file download to stop. This may serve to reduce the amount of overshoot where application traffic continues after network utilization increases.

Certain embodiments may provide various benefits or advantages. For example, a significant reduction in the amount of battery drain and wireless resources consumed performing possibly periodic knowledge server URL queries may be obtained. For example, a knowledge server response may frequently be the same as the last time a device queried from a given location. If a user equipment can expect a push notification in case the conditions significantly improve, the user equipment may avoid unnecessarily re-querying. The push message can indicate at least one threshold associated with network service viability. For example, the push message can indicate a threshold associated with an environmental condition of the user equipment. The threshold can be a single threshold or a dynamic threshold, as discussed below in greater detail.

Figure 2:
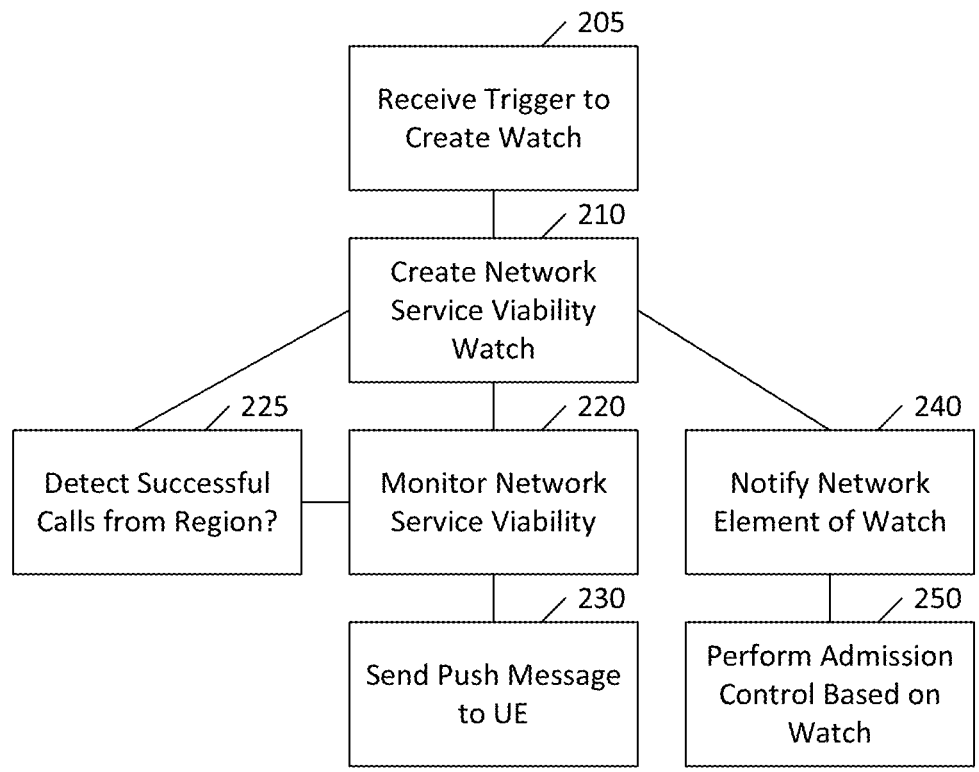
FIG. 2 illustrates a method according to certain embodiments.

FIG. 2 illustrates a method according to certain embodiments. As shown in FIG. 2, a method may include, at 205, receiving some trigger to create a watch. This trigger may be received as a request or query from a user equipment, an application server, or may be self-generated by a network element.

The method may include, at 210, creating a network service viability watch for the user or the application. The creating the network service viability watch can be performed upon detection of at least one event. The event can include at least one of the user equipment traversing a geographic region, a user equipment or application initiating a service (for example, unsuccessfully initiating a service), or a significant increase in coverage or wireless service quality. The event may include that the initiating the service failed due to a network or application server.

The event may, for example, include a user equipment traversing the geographic region more than a threshold number of times. Moreover, the event may include that the user equipment has not placed any calls or real time communications within the geographic region.

The method may also include, at 220, monitoring network service viability for a user or application, for example a user application. The monitoring can be based on the created network service viability watch. The monitoring can include monitoring at least one of required bit rate, delay, utilization, or geographic location. The monitoring can further include monitoring radio conditions in a geographic area corresponding to the user, wherein monitoring the radio conditions includes monitoring at least one of radio resource control messages, handoff messages, handover messages, tracking area updates, channel quality indicator messaging, reference signal received quality messaging, reference signal received power messaging, measurement report messaging, operations and maintenance messaging, or remote electrical tilt messaging. The monitoring can further include the monitoring radio condition impact anticipated, wherein newly initiated call or transfer by another UEs causes an update to the estimated radio conditions and therefore triggers the push notification.

The method may further include, at 230, sending a push message to a user equipment when network service viability is detected for the user or the application. The sending the push message can include sending a unicast message to the user equipment or sending a group message to a group that includes the user equipment. The push message can be an application level push message. The push message can indicate at least one threshold associated with network service viability, as mentioned above and discussed at greater length below.

The method can also include, at 240, notifying a network element of an access network of the network service viability watch. The network element, in response, at 250 can impose stricter admission control based on the watch.

The sending the push message may be conditional on not detecting, at 225, successful calls within a first geographic region, wherein calls were previously consistently unsuccessful in that first geographic region.

Service viability notifications can be created through a separate application path than the actual application bearer traffic. In other words service viability notifications can be received from a first server, which does not receive or process any of the traffic associated with the application being influenced by the notifications themselves. This distinction may be further seen in the case where there are two different applications on the handset, and each application separately configures watches with the same network service viability watch system.

Such an approach for notifications may contrast with an approach in which the traffic associated with the user application passes through a midpoint in the network where it is manipulated based on the results of a network monitor. Thus, in such cases application content is delay/queued at a midpoint based on output of a network monitoring element. By contrast, certain embodiments do not require intercepting application traffic at a mid-point. Instead, certain embodiments can selectively push selected network monitoring knowledge directly to the application on the UE. Thus, there may be less need for nuanced App knowledge in the network. Accordingly, in certain embodiments sending a message directly to an application can refer to avoiding any network monitoring midpoint level delay, queueing, or processing of the message, although the message can be relayed through various nodes and may experience typical lower level processing in transit.

Figure 3:
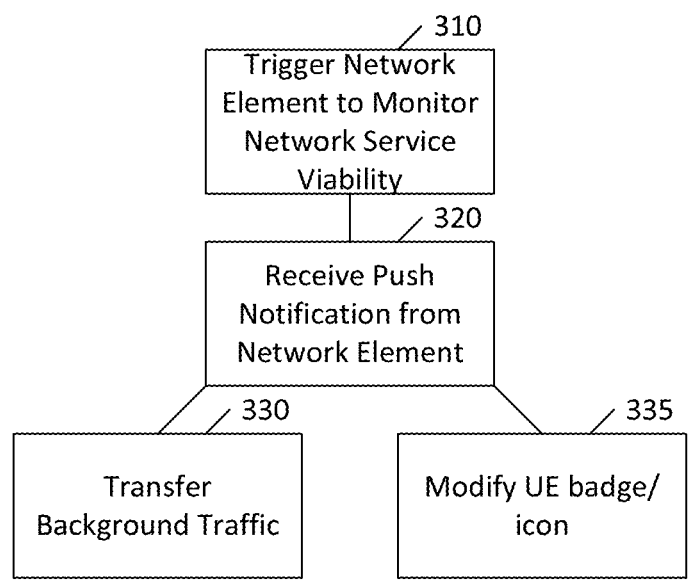
FIG. 3 illustrates another method according to certain embodiments.

FIG. 3 illustrates another method according to certain embodiments. As shown in FIG. 3, a method can include, at 310, triggering a network element to monitor network service viability for a user or application, for example, by sending, from a user equipment, a query to monitor network service viability for a user application. Thus, this triggering can be triggered intentionally by sending a message to a server or access point. For example, the triggering can include creating a service viability watch by the application. Alternatively, the triggering can be done unintentionally, by (for example) repeatedly terminating calls in particular geographic areas, starting calls in particular geographic areas, or forgoing real-time communication in certain geographic areas, or selecting alternate navigational routes. Additionally, triggering may be configured to be performed based upon a combination of network conditions and user traffic mobility estimation, for example related to vehicular traffic congestion.

The method can also include, at 320, receiving a push notification based on the monitoring. In response to the push notification, the method can include performing at least one of, at 330, transferring background traffic by a different/second application, such as an application enhancer, or modifying, at 330, a badge, application icon, or contact icon. The modification can be to the appearance or functionality of the badge or icon. For example, an icon can be locked, and this locked status can be shown by placing a padlock badge over the icon, until the push notification is received. The modifying, therefore, can include locking or unlocking functionality in response to the push notification.

Figure 4:
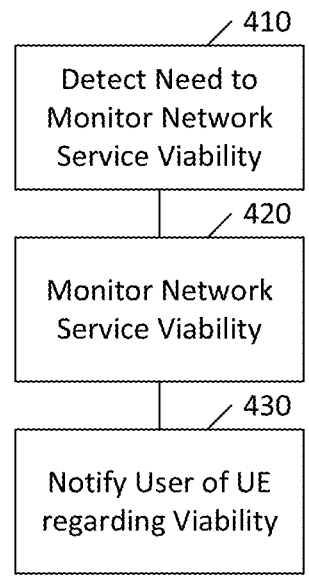
FIG. 4 illustrates a further method according to certain embodiments.

FIG. 4 illustrates a further method according to certain embodiments. As shown in FIG. 4, a method can include, at 410, detecting, at a user equipment, a need to monitor network service viability for an application of the user equipment. The method can also include, at 420, monitoring network service viability based on the detecting. The detecting can include detecting a pattern of connectivity correlated to geographic area and radio conditions. The method can further include, at 430, notifying a user of the user equipment when network service viability improves beyond a predetermined threshold.

Figure 5:
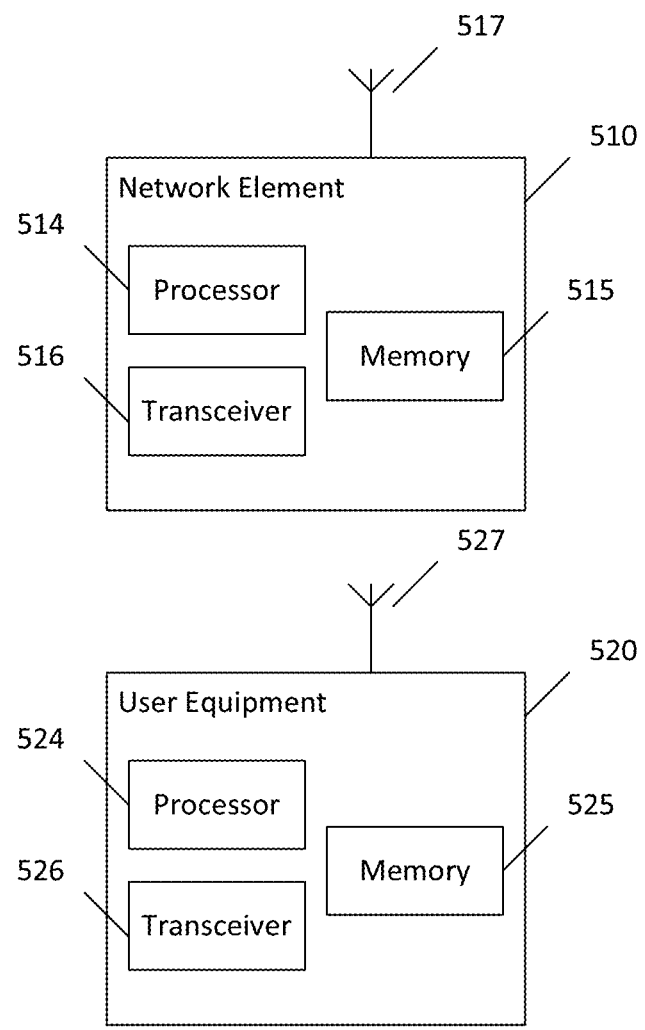
FIG. 5 illustrates a system according to certain embodiments.

FIG. 5 illustrates a system according to certain embodiments of the invention. It should be understood that each block of the flowchart of FIGS. 1-4, 6, and 7 and any combination thereof may be implemented by various means or their combinations, such as hardware, software, firmware, one or more processors and/or circuitry. In one embodiment, a system may comprise several devices, such as, for example, network element 510 and user equipment (UE) or user device 520. The system may comprise more than one UE 520 and more than one network element 510 (as shown in FIG. 1, for example), although only one of each is shown in FIG. 5 for the purposes of illustration. A network element can be an access point, a base station, an eNode B (eNB), a server (for example, a knowledge server) or any of the other network elements discussed herein. Each of these devices may include at least one processor or control unit or module, respectively indicated as 514 and 524. At least one memory may be provided in each device, and indicated as 515 and 525, respectively. The memory may include computer program instructions or computer code contained therein. One or more transceiver 516 and 526 may be provided, and each device may also include an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally configured for wired communication, in addition to wireless communication, and in such a case antennas 517 and 527 may illustrate any form of communication hardware, without being limited to merely an antenna. Likewise, some network elements 510 may be solely configured for wired communication, and such cases antenna 517 may illustrate any form of wired communication hardware, such as a network interface card.

Transceivers 516 and 526 may each, independently, be a transmitter, a receiver, or both a transmitter and a receiver, or a unit or device that may be configured both for transmission and reception. The transmitter and/or receiver may also be implemented as a remote radio head which is not located in the device itself, but in a mast, for example. It should also be appreciated that according to a liquid or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

Processors 514 and 524 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set, for example, procedures, functions, and the like. Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity may be internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 510 and/or UE 520, to perform any of the processes described herein (see, for example, FIGS. 1-4 and 6-9). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, or the like, or a low-level programming language, such as a machine language, or assembler. Alternatively, certain embodiments of the invention may be performed entirely in hardware.

Furthermore, although FIG. 5 illustrates a system including a network element 510 and a UE 520, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node. The UE 520 may be a cluster member, including either a cluster slave or a cluster master.

Figure 6:
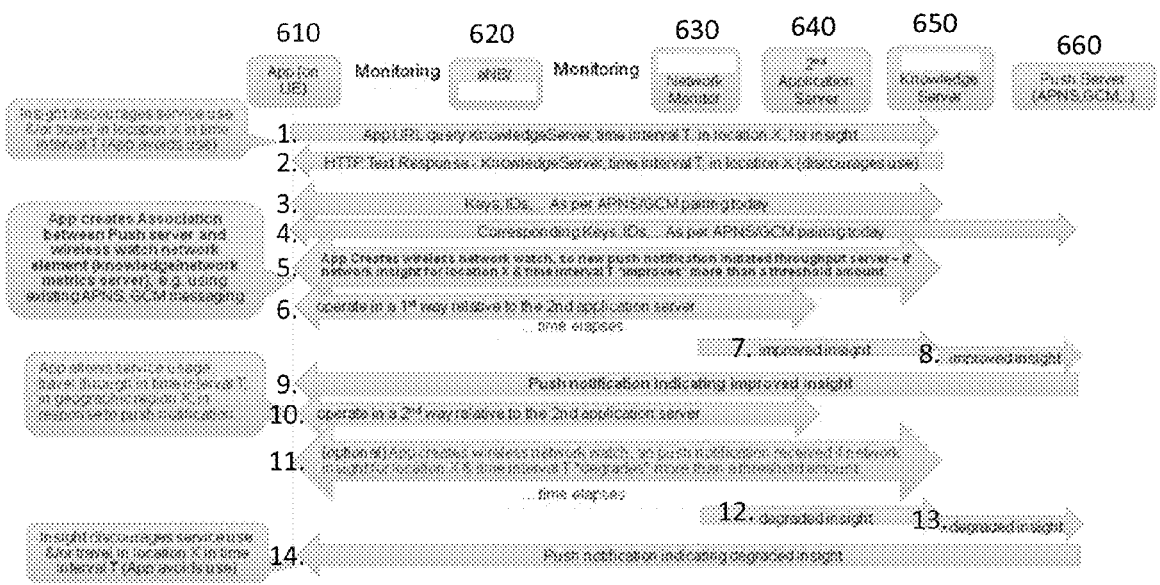
FIG. 6 illustrates a message flow according to certain embodiments.

FIG. 6 illustrates a message flow according to certain embodiments. As shown in FIG. 6, an app on a user equipment 610 may, at 1, send a URL query to a knowledge server 650 by way of eNB 620. The query may specify a timer interval T and/or a location X At 2, the knowledge server 650 may respond with an HTTP text response, which may discourage use. At 3, there may be a pairing of keys, IDs and so forth between the user equipment 610 and the knowledge server 650. Likewise, at 4, the push server 650 may be similarly informed of the corresponding pairings. At 5, the application on the user equipment 610 can create a wireless network watch with knowledge server 650, such that a new push notification will provided from the network if network insight for location X and/or time interval T improves more than a threshold amount. The user equipment 610 can then, at 6, act in a first way with respect to a second application server 640. Time may elapse and, at 7, a network monitor 630, which may be monitoring the network conditions, for example, by receiving reports from the user equipment 610 and/or the eNB 620, may provide improved insight to the knowledge server 650. In turn, at 8, knowledge server 650 can convey an indication of the improved insight through a push server 650. The push server 650, at 9, can send a push notification indicating or conveying the improved insight. At 10, the application on the user equipment 610 can allow service usage and/or travel in time interval T and/or geographic region X, in response to the push notification. Moreover, the application on the user equipment 610 can begin to operate in a second way relative to second application server 640.

Optionally, at 11, the application on the user equipment 610 can create a wireless network watch with knowledge server 650, such that a new push notification will provided from the network if network insight for location X and/or time interval T degrades more than a threshold amount. Time may elapse and, at 12, a network monitor 630, which may be monitoring the network conditions, for example, by receiving reports from the user equipment 610 and/or the eNB 620, may provide degraded insight to the knowledge server 650. In turn, at 13, knowledge server 650 can provide an indication of the degraded insight to push server 650. The push server 650, at 14, can send a push notification indicating improved insight.

Figure 7:
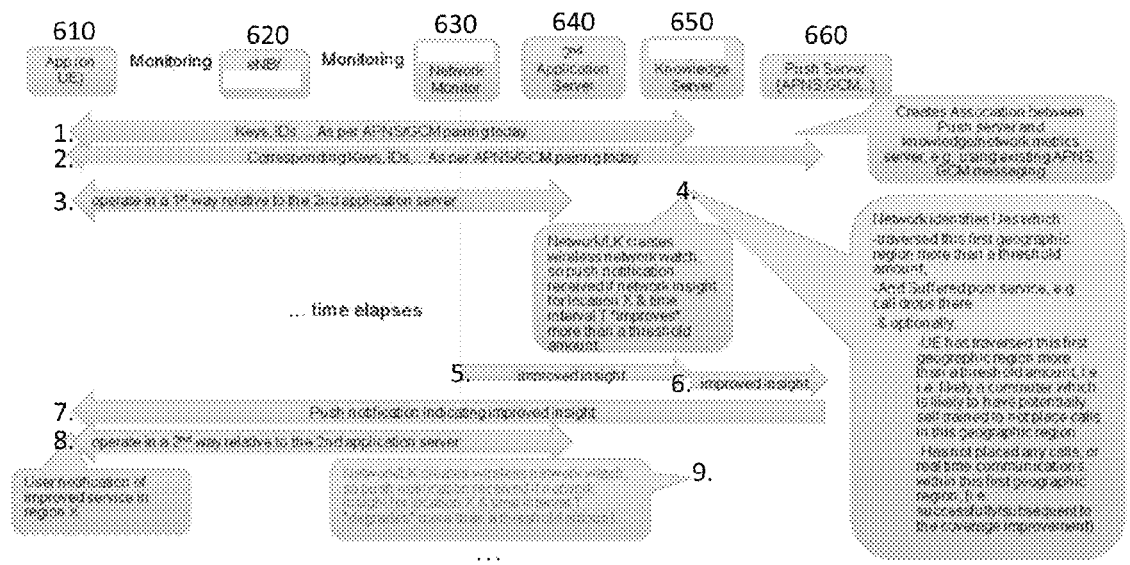
FIG. 7 illustrates another message flow according to certain embodiments.

FIG. 7 illustrates another message flow according to certain embodiments. As shown in FIG. 7, at 1, an application on a user equipment 610 can send keys, IDs, and the like to a knowledge server 650, and at 2 can send corresponding keys, IDs, and so on to a push server 660. This may create an association between the push server and knowledge/network metrics server. At 3, the user equipment 610 may operate in a first way with respect to a second application server 640. Meanwhile, at 4, the network (for example, knowledge server 650) may identify UEs that have traversed a first geographic region more than a threshold amount and suffered poor service, such as call drops, in that first geographic region. Optionally, the knowledge server 650 may take into account other factors, such as how likely the user is to have self-trained not to place calls in the region. Moreover, the knowledge server 650 may take into account whether the user equipment 610 has successfully placed any calls or other real-time communications within the first geographic region, particularly subsequent to any improvements. Also at 4, the knowledge server 650 can create a watch for pushing notification if network conditions improve within time interval T and/or geographic region X.

Time may elapse. When network conditions improve, at 5, a network monitor 630, which may be monitoring the network conditions, for example, by receiving reports from the user equipment 610 and/or the eNB 620, may provide insight of improved network conditions to the knowledge server 650. In turn, at 6, knowledge server 650 can convey an indication of the improved insight through push server 650.

The push server 650, at 7, can send a push notification indicating improved insight. The push server 650 may not be aware of the reason for the push notification or of the contents of the push notification. Thus, the indication may be pushed in a message that is opaque to the push server 650, thereby avoiding any network monitoring midpoint level processing or delay at the push server 650. In other embodiments, the push server 650 may receive an indication that is formulated into a suitable message at the push server 650, but this can be avoided in certain embodiments.

At 8, the application on the user equipment 610 can allow service usage and/or travel in time interval T and/or geographic region X, in response to the push notification. Moreover, the application on the user equipment 610 can begin to operate in a second way relative to second application server 640.

Figure 10:
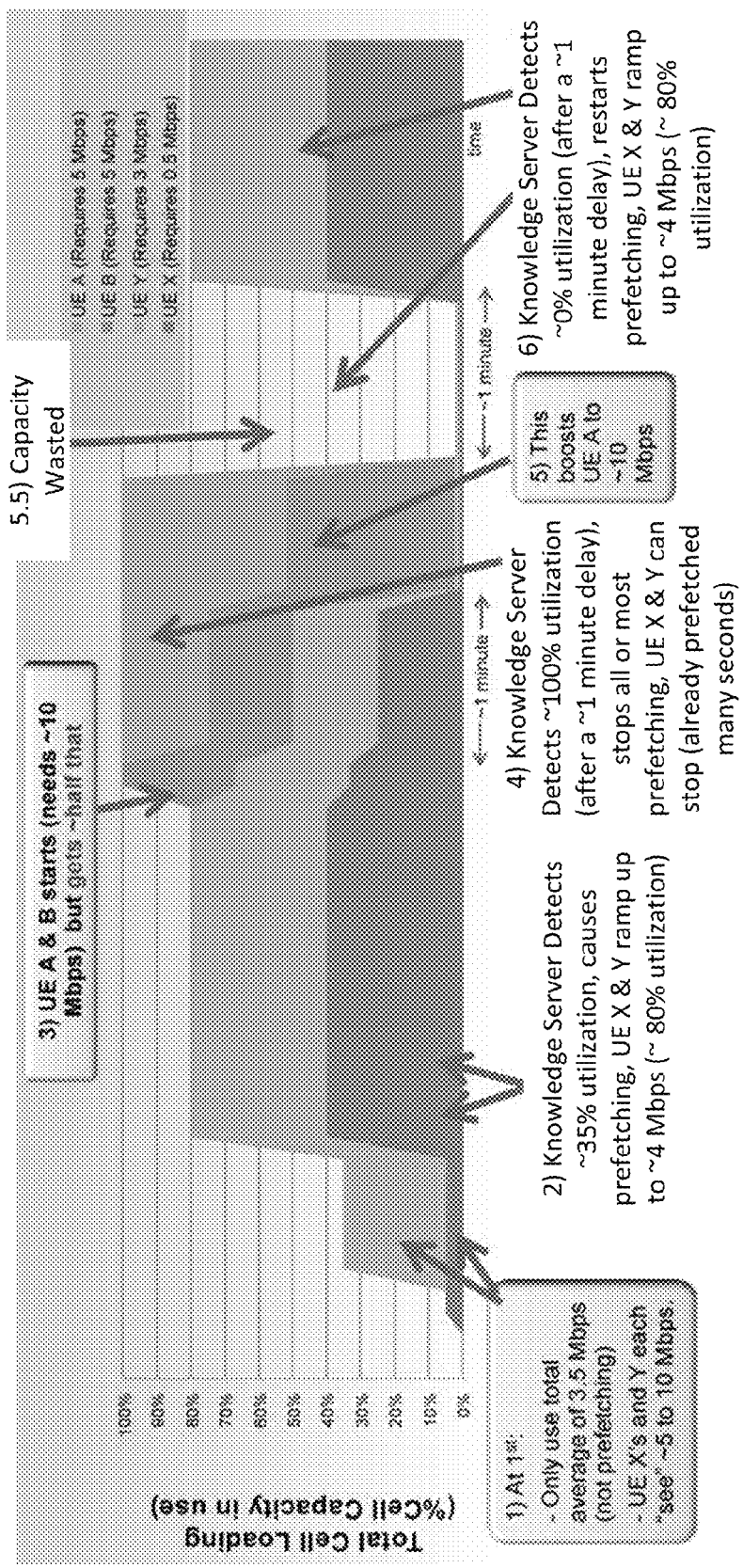
FIG. 10 illustrates an example of knowledge server insight applied without application detection of network conditions, according to certain embodiments.

Optionally, at 9, the knowledge server 650 can create a watch for pushing notification if network conditions degrade within time interval T and/or geographic region X FIG. 10 illustrates an example of knowledge server insight applied without application detection of network conditions, according to certain embodiments. As shown in FIG. 10, at 1, at first a cell may use a total of 3.5 Mbps, not including any prefetching. Meanwhile the UEs may see from about 5 to 10 Mbps. A knowledge server can, at 2, detect that utilization is about 35% and can cause prefetching, leading each of UE X and Y to ramp up to about ~4 Mbps, yielding ~80% utilization. Then, at 3, UE A and B can each arrive in the cell, needing about 10 Mbps, but getting only about half of that. At 4, the knowledge server—after about one minute of delay—can stop all or most prefetching and UE X and Y can stop all data usage, because they have already fetched many seconds of data. At 5, the reduced usage by X and Y can allow UE A to get its full amount of data. Then, as UE A stops its usage UE B can get its desired bandwidth and then also stop. There can be a delay of about 1 minute at 5.5. During this delay, there can be wasted capacity. At 6, the knowledge server can detect about 0% utilization and can restart prefetching. UEs X and Y can ramp up to about 4 Mbps again.

As illustrated by FIG. 10, there can be a delay between network resources becoming available or full and the knowledge server either knowing about this situation or deciding to take action. This delay may be deliberate, to avoid excessive ping pong effects. Additionally, this delay can avoid overwhelming the core network with numerous and frequent knowledge server updates.

Thus, certain embodiments can provide a set of knowledge server insight maintenance instructions. In the case of ping pong avoidance, these instructions can instruct the application such that the application makes no sudden moves. In other words, certain embodiments can deal with a mechanism for the knowledge server to additionally remotely control the scheduled rate at which the application updates its insights, corresponding to a maximum prefetching rate. Specifically, in certain embodiments a knowledge server or the applications themselves can configure a maximum prefetching bit rate. That maximum prefetching rate can be one that can be increased over a period of time, for example in a staircase fashion when prefetching is first initiated. Furthermore, when prefetching is nearing its conclusion, it can also then be reduced in a stair step fashion. This knowledge server insight maintenance can also be referred to as knowledge server insight ramping.

The decisions/mechanisms for controlling prefetch decisions can be controlled at the application layer inside the applications on the UE. For example, such decisions can be controlled where battery life is known, and where URL queries for the next section of video can be generated. Knowledge servers can provide an over-the-top (OTT) mechanism for enabling a network to serve network insights to these applications, triggering these applications to perform additional prefetching when wireless resources are being wasted. However, the knowledge server goal may also be to do no harm, thereby encouraging additional prefetching, while also avoiding triggering too much loading.

The knowledge server/OTT control mechanisms for influencing the amount of prefetch may operate on a timescale of, for example, seconds rather than milliseconds or microseconds, like a radio scheduler.

Reasons why a knowledge server may operate on longer timescale can include the fact that the knowledge server is dealing with encouraging/discouraging traffic at an application layer. Application layer traffic is often divided into individual files. For example, with HTTP adaptive video, each approximately 5 or 10 second section of video can be a separate file. Therefore, once the application requests the file corresponding to a section of video, it can take seconds before the prefetching traffic can be stopped. Stopping a mid-file download by, for example, closing a connection, can create additional waste as the partially downloaded file may need to be re-downloaded later in order to retrieve the remaining portion of the file.

Moreover, certain embodiments of a knowledge server may aim to provide a low level of implementation complexity. For example, certain embodiments of knowledge server do not need to be collocated with an eNB. As a result, a knowledge server may not directly calculate the maximum prefilling data rate. For example, the knowledge server does not micromanage the exact amount of prefetching traffic generated by each UE, and the knowledge server does not need to require/utilize very short-term radio information on a per-UE basis. For example, the knowledge server may not need to know information such as the number of symbols or physical resource block per information bit per UE.

Additionally, certain embodiments of a knowledge server may avoid unnecessary and/or repetitive, supervision messaging between the network/knowledge server and the UE.

Because of this longer timescale in supervision responses, the knowledge server may target, for example, 80% network utilization. If network utilization exceeds 80% then the knowledge server may reduce the amount of prefetching.

The longer timescale responses can additionally address prefetch ping-ponging, where prefetch is encouraged, but then quickly discouraged because too much prefetching has been allowed, and prefetch overshoot where prefilling continues for a while after the cell becomes very congested, or prefilling does not start even though it may be considered appropriate based on radio conditions.

Insight ramping can be one way to address ping-pong, while avoiding frequent insight messaging, and simultaneously avoiding scenarios where prefetching causes the network to become over utilized, such as, for example over 80% utilized.

Figure 12:
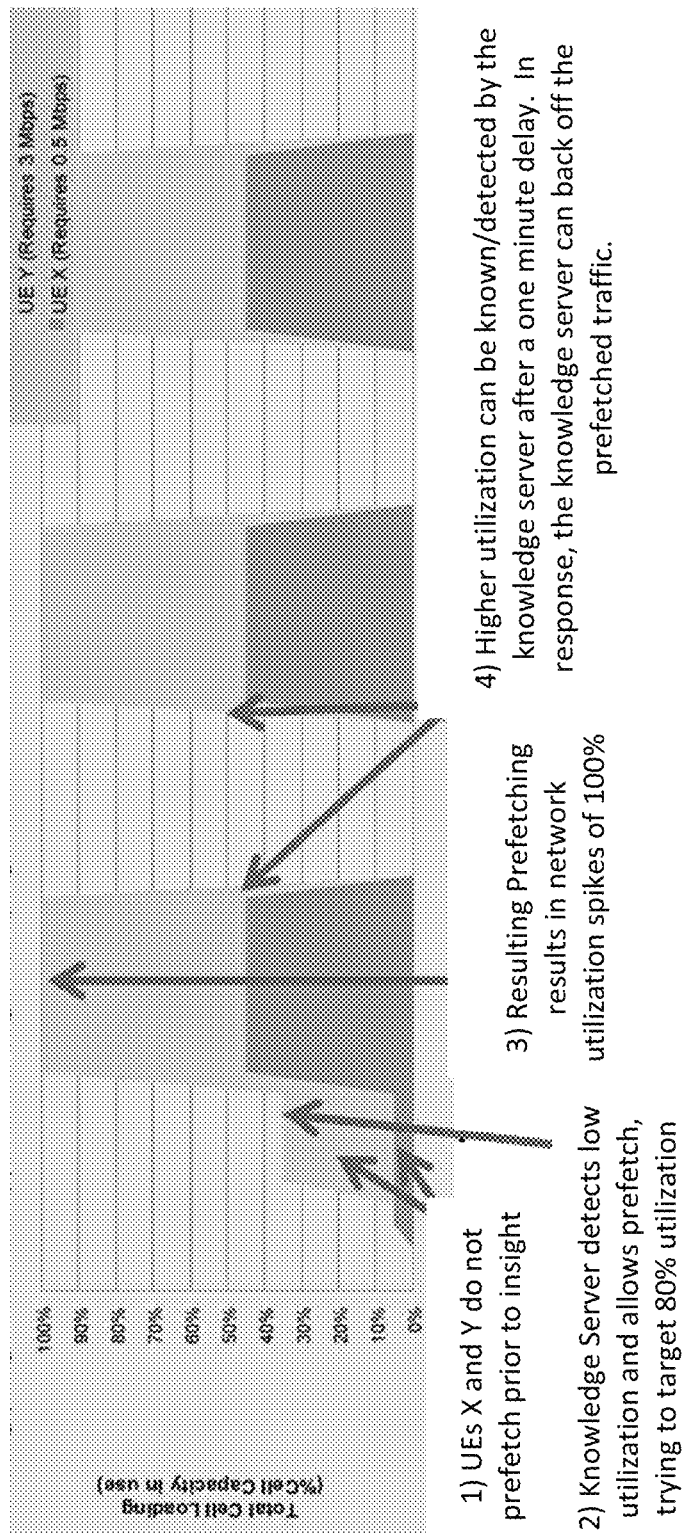
FIG. 12 illustrates a ping-pong scenario according to certain embodiments.

FIG. 12 illustrates a ping-pong scenario according to certain embodiments. As shown in FIG. 12, at 1 UEs X and Y are not prefetching because insight has not yet been received. Then, at 2 the knowledge server detects low utilization and permits prefetching. However, the resulting prefetching may cause a spike in network utilization at 3. This higher utilization can be detected by the knowledge server after a period of time, at 4. In response, the knowledge server can back the prefetching down. However, in another minute the cycle may again repeat.

Certain embodiments provide a mechanism for exploiting otherwise wasted or idle wireless system capacity by providing certain network insights to applications running on UEs, such that the applications that requested the insight can make use of these insights. These applications can have several control points that can make use of these insights.

The OTT insight update can be pushed to UEs when the networking insight change is detected. However, the insights can be updated even more quickly, and with even less network loading being caused by the insights themselves, in certain embodiments. Thus, certain embodiments permit faster/more efficient application responsiveness to the changing network insights. Specifically, certain embodiments can achieve this effective latency reduction through the use of specific application insights maintenance rules, orchestrated by a knowledge-based system. One embodiment is an application administrated rule that controls when the application should stop using a previous insight recommending prefetching, namely discarding this prefetch insight and/or stop prefetching.

In this embodiment, the application can make this update locally, without the need to wait for additional network messaging. Instead, the application can make the decision to discard the earlier insight, namely to stop using the most recent insight, when the application observes that the current link speed has changed sufficiently from a baseline link speed associated with the last network insight. This rule can permit the application to almost instantaneously stop prefetching when it detects that the current link speed has, for example, dropped to half of the link speed the application observed at the time the application received the networking insight recommending prefetching. This may be useful, for example, in a stadium environment where it may be important to stop prefetching immediately, when a sudden network loading spike occurs, such as at the time a touchdown, goal, home run, or the like, is scored. Thus, certain embodiments use insights provided by an over-the-top network in combination with local application-based rules for determining when those insights are discarded, such as, for example, in response to the application's detection of current link speed.

Figure 8:
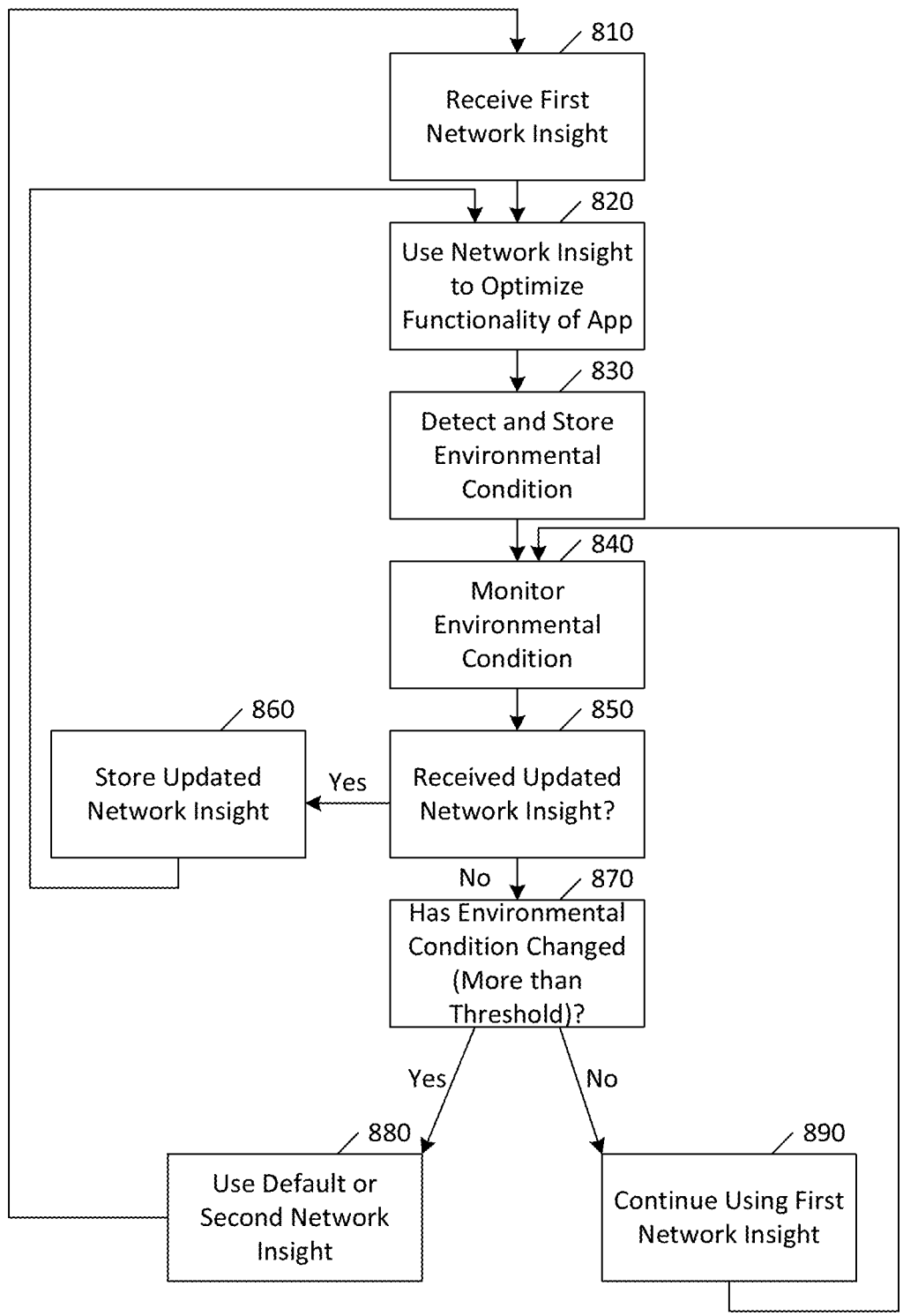
FIG. 8 illustrates a method according to certain embodiments.

FIG. 8 illustrates a method according to certain embodiments. As shown in FIG. 8, a method can include, at 810, receiving a first network insight by an application of a user equipment. This insight can be received from a network element such as a knowledge server. This insight can be pushed by the knowledge server or can be received in response to a request made to the knowledge server.

The knowledge server can provide various insights to applications. These insights can be based upon network knowledge which is not directly visible to applications, such as the eNB utilization. The network insight policies can be provided over the top (OTT) by the knowledge server. Then, an application in the UE can integrate these insights into the application's interaction with a separate application server on the Internet.

The method can also include, at 820, using the network insight to optimize functionality of the application or the user equipment. The optimization may include, for example, deciding to prefetch, deciding how much data to prefetch, or deciding what kind of data to prefetch. For example, based on a network insight the application may decide to prefetch for streaming video, but not for web browsing, since the two kinds of data may have different servers or different benefits from prefetching.

The method can additionally include, at 830, detecting and storing an environmental condition. This environmental condition can be a network condition, such as speed, latency, or packet loss of a link used by the user equipment and/or application. Other environmental conditions may be the kind of connection that a user equipment has to a network, such as fourth generation (4G), long term evolution (LTE), third generation (3G), Wi-Fi, wireless local area network (WLAN), and so on.

The detecting and storage of the environmental condition at 830 is shown after the optimizing at 810. The order of these steps, however, can be reversed, or these operations can be performed in parallel.

The method can also include, at 840, monitoring the environmental condition. This monitoring can include periodically measuring or requesting measurements of the condition. The monitoring can also include receiving updates regarding environmental conditions from a server.

The method can further include, at 850, evaluating whether an updated network insight has been received. This evaluation can be performed periodically, or this evaluation can be automatically triggered by reception of a new network insight. In cases where the network insight is not necessarily pushed, the evaluation can include requesting a current network insight from a knowledge server. Thus, for example, the knowledge serve can configure mechanisms such that the application automatically updates insights in response to changes in the UE application's detection of changes in local environment, such as wireless link speed The criteria for determining whether to update a network insight, whether this determination is made at the UE, eNB, or knowledge server, may depend upon the amount of time that has elapsed subsequent to the beginning of the current prefetching event. Thus, for example, the application insight can be periodically automatically incremented, achieving a ramp-like pattern. This insight ramping can automatically increase/decrease the amount of prefetch according to a schedule, and not just each time it receives a new knowledge server message. This ramp-like approach may have multiple phases. For example, an application can increase the rate of prefetching more rapidly during a first phase, and then less rapidly during a second phase, as it becomes more likely that the insight is old or the cell is approaching an 80% utilization target. Thus, in certain embodiments an application can continue to perform such increases, until a link speed observed by the application changes more than a threshold amount.

As shown in FIG. 8, if there is a new network insight, at 860 the method can include storing the new network insight. Then, the method can proceed with optimizing at 820, and so on.

If there is no new network insight, at 870 the method can include determining whether a network condition has changed more than a threshold. Alternatively, the determination can simply be a determination about whether the network condition has changed. For example, if the original condition is that the user equipment is dual connected to LTE and Wi-Fi, and this changes at all, then the user equipment can treat this like a significant change in network latency, packet loss, or the like. The threshold can be set to, for example, if network latency doubles, if the data rate falls to half, or if the packet loss doubles. Other thresholds are also permitted.

If the threshold or other condition is met, then at 880 the method can include using a default or second network insight. The default insight can be one in which the user equipment and/or application proceeds as if completely ignorant of the network insights previously provided by a knowledge server. Thus, for example, by default the user equipment and/or application may be configured not to prefetch, not to prefetch for applications like video streaming, or not to prefetch beyond a certain maximum amount of data. Thus, for example, if a link speed condition is found to deviate more than a threshold amount from a corresponding stored value, then the application can stop prefetching.

The second insight can be generated by the user equipment. For example, a user equipment can multiplicatively increase or decrease prefetch or other insight-based behavior, based on the detected network condition. For example, if link speed halves, then the user equipment can correspondingly halve prefetching. Alternatively, if link speed halves, then the user equipment can quarter prefetching. An application itself can provide a value that can be used to calculate a changed rate based on the changed network conditions.

The threshold can be set such that when a link speed, for example, exceeds a threshold, then prefetching is permitted, or when link speed falls below a threshold, prefetching is forbidden. In a particular instance, if a bit rate encountered by an application is small enough, then no prefetching beyond just in time may be permitted.

The threshold itself can be preconfigured by the application, or may be indicated by the knowledge server or some other server. In a specific example, there may be a link speed based insight maintenance mechanism, applied to a video currently playing out on a mobile device. In this example, the video can have a peak bit rate of 1 Mb per second. Thus, the mobile device can be instructed by the knowledge server to perform prefetching if the mobile device's download of video segments is still encountering at least 3 Mb per second, otherwise the mobile device should stop prefetching immediately.

The threshold itself can be preconfigured by the application, or may be indicated by the knowledge server or some other server. In a specific example, There may be a link speed based insight maintenance mechanism, applied to a video currently playing out on a mobile device. In this example, the video can have a peak bit rate of 1 Mb per second. Thus, the mobile device can be instructed by the knowledge server to perform prefetching if the mobile device's download of video segments is still encountering at least 3 Mb per second, otherwise the mobile device should stop prefetching immediately.

The threshold can be time varying. Thus, for example, the link speed requirement can vary as a function of time. For example, the threshold for stopping prefetching can increase over time, making it progressively less and less likely that the UE app will continue to perform prefetching, the longer it has been since the last insight was received. Meanwhile, if the link speed is particularly high then prefetching can continue for longer. This changing link speed threshold can be referred to as a glide path.

When a network element supplies the threshold, the network element itself can randomize or otherwise stagger thresholds from UE to UE. Alternatively, the UE application itself can apply a randomization factor to the threshold. The use of staggered thresholds across UEs, even those UEs having similar conditions, can be useful in that as the cell becomes more loaded, more and more of the users can gradually stop prefetching. The staggering may be random or may be configured based upon the relative priority of the users, with the lowest priority users having the lowest threshold such that they will stop prefetching first.

When the network becomes over-utilized, instead of transmitting updated insights to stop prefetching, the network can simply temporarily throttle the bit rate to prefetching users, in order to trigger them to stop prefetching. This may be useful, for example, when an eNB wants to stop prefetching for local reasons, whereas the knowledge server may not be under the control of the eNB.

Additionally, if traffic flow associated with a given application has been configured to have a lower, for example best effort, quality of service (QoS) setting, then additional, for example higher, priority traffic can cause a particularly dramatic change in the link speed achieved by the given application when a loading spike occurs. The application can, therefore, observe this link speed drop particularly quickly, and therefore completely stop prefetching in response.

As shown in FIG. 8, if the environmental condition has not changed, or has not changed more than a threshold, then at 890 the method can include continuing to use the first network insight. Thus, the method can proceed by monitoring the environmental conditions at 840, and so on.

Various implementations of certain embodiments are possible. For example, certain embodiments may be implemented in association with an application programming interface (API).

Figure 9:
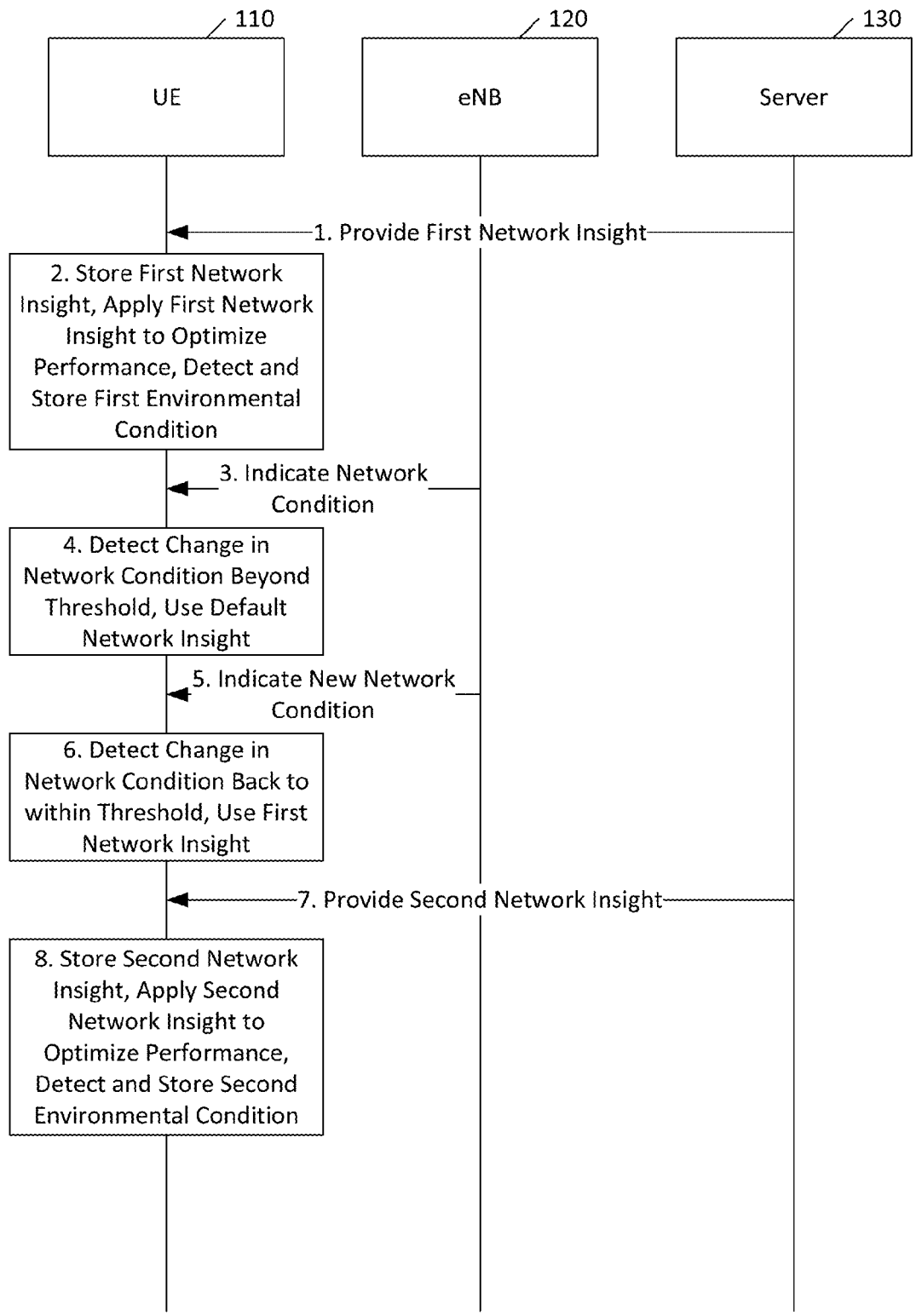
FIG. 9 illustrates a signal flow according to certain embodiments.

FIG. 9 illustrates a signal flow according to certain embodiments. As shown in FIG. 9, at 1 a server 130 can provide a first network insight. This insight can describe a network condition explicitly or can describe the network condition in terms of an action of the user equipment 110 with respect to this condition. For example, the network insight can indicate to turn prefetching on or off, either directly by instructing the user equipment 110 to turn prefetching on or off, or indirectly by indicating a current level of network loading.

At 2, the user equipment 110 can store the network insight, apply the network insight to optimize performance of the user equipment 110 or an application for the equipment 110, and detect and store a first environmental condition. This network insight can be referred to as a first network insight.

At 3, the eNB 120 can indicate a network condition to the user equipment 110. There are also other ways that the user equipment 110 can determine network conditions, such as by directly measuring the conditions itself. This network condition may be or relate to the environmental condition with respect to which the user equipment 110 has a stored value.

Then, at 4, the user equipment 110 can detect a change in network condition beyond a threshold, or otherwise any change that suggests that the first network insight may be stale or irrelevant. This detection can be based on a comparison between a recently received network condition and a previously recorded network condition. Thus, the user equipment 110 can resort to a default network insight. This may be a preconfigured default network insight. Alternatively, this may be a network insight that was previously provided during a time when network conditions correspond to the network conditions now observed by the user equipment 110.

At 5, the eNB 120 can indicate a new network condition. This condition may be different from the network condition previously indicated. At 6, the user equipment 110 may detect that there has been a change in network conditions back to within the threshold previously used. Thus, the user equipment 110 may resume using the first network insight.

At 7, the server 130 may provide a second network insight. The second network insight may differ from the first network insight. Thus, at 8 the user equipment 110 may store the second network insight, apply the second network insight to optimize performance of the user equipment 110 and/or application, and detect and store a second environmental condition.

Other variations are also permitted. For example, insight maintenance mechanisms do not have to be based only on local detection of link speed. Rather, a wider set of inputs can be quickly detected by an application. The application can determine that an insight is appropriate based on a current set of conditions, and the degree to which the current set of conditions have changed beyond a certain threshold. The thresholds may be, for example, configured by the knowledge server. When the threshold is passed, then insight may be deemed no longer valid and can be discarded and/or replaced with a different or default insight. Specific additional example criteria along with corresponding problem/rationale are described below.

The criteria for determining whether to update the knowledge server network insight can additionally depend upon mobility or velocity. For example, the system can automatically decrease the amount of prefetching when the UE begins moving, such as towards fewer bars and/or away from a serving base station to which the UE was connected at the time of receiving the most recent insight). This approach may be useful in connection with small cells, where an application on a user equipment passing through an underutilized small cell could immediately initiate prefetching upon arriving to the cell, without waiting for a corresponding insight to start prefetching, after the network detects that it has handed off into the small cell.

Another criteria for determining whether to update the knowledge server network insight can be, for example, the number of bytes already downloaded, and/or remaining to be downloaded in a current file being prefetched. Thus, for example, in a case where the insight would normally cause the entire prefetching process to stop, if the application is particularly close to the end of prefetching the file, then it may be allowed to continue downloading the file, in order to avoid creating waste by corrupting the file download, where the entire file would otherwise need to be re-downloaded.

In another embodiment, there can be a message-less mechanism for automatically rotating prefetching among a group of different UEs. For example, there can be a periodic schedule, such that the users are taking turns. For example, the link speed criteria can depend upon at least one of the amount of time since the mobile last performed prefetching or the amount of currently prefetching UEs in the area. This approach may have an incremental benefit of efficiency from a battery and RF perspective when users take turns instead of performing prefetching in parallel.

Alternatively, the criteria for determining whether to update the knowledge server network insight can additionally depend upon audio/acoustic noise present at a microphone of the user equipment. For example, in a stadium environment changes in acoustic noise detected through the handset microphone can indicate sudden changes in network loading, for example, at the time of a scoring event on the field. Thus, in certain embodiments reduction in rate of prefetching can be automatically triggered based on acoustic noise detected by the application. For example, a user equipment OS or user interface application or component can detect at a microphone of the device. Moreover, when there is an ongoing voice call and the prefetching is being supervised by the OS, the OS may have access to the microphone.

Other options are possible. For example, a UE's microphone may be always listening to be able to identify user commands, or the microphone may be turned on whenever a user is actively using the device, for a similar reason. For example, in stadium environments a spike in the acoustic noise may be strongly correlated with huge increases in delay sensitive user traffic. For example, when there is an exciting play on the field, users may perform greater amount of messaging and/or calls or posting of photo or video to websites. In another example, in NASCAR automobile racing, when the acoustic noise decreases, such as when there is a yellow flag on the race circuit and the cars slow down, the amount of user traffic/phone calls may surge immediately.

Alternatively, the criteria for determining whether to update the insight can depend upon the amount of time/bytes remaining until the current prefetch event is expected to complete, as mentioned above. This may be applicable to a case in which the prefetching rate is incrementally ramped down at the end of the prefetching event. This may also be applicable to a case in which the application insight is periodically automatically decremented, achieving a ramp like pattern. In this ramping embodiment, the application can self-throttle the rate of prefetching on the downlink by, for example, controlling how quickly it requests the next file to be prefetched. For example, in the case of HTTP adaptive streaming, the application may prefetch an extra 10 second video segment every 10 seconds, or every 1 second. Alternatively, the application or the UE OS may self-throttle the rate of prefetching by controlling the rate at which the downloaded file is retrieved from the download buffer, or by limiting how quickly TCP/IP acknowledgments are transmitted in response to the download received thus far.

Mobility may be visible to the application and/or operating system. If a UE is prefetching and detects mobility, relative to a trajectory at the time of the last knowledge server insight, then the UE can stop prefetching until the UE gets a new update of the knowledge server insight. For example, if a given UE moves close to a particular eNB, it may seek to use 5 Mbps while two other UEs are downloading. With mobility criteria, this can be avoided, and the link speed of the two downloading UEs may not be degraded due to prefetching when loading is already 100%.

In a particular example, UEs X and Y can share 10 Mbps, but then UE Z arrives. At first, UE X and Y may avoid prefetching, and consequently may use 0.5 and 3 Mbps respectively. UE X's service may need 0.5 Mbps but may see 5 Mbps as available. Likewise, UE Y's service may need 3 Mbps and may see 5 Mbps as available. The knowledge server may detect about 35% utilization, and so may cause or encourage prefetching, leading to each of UE X and Y using about 4 Mbps. In this case, a knowledge server can help to prevent prefetch in cases like this in which some UEs may see higher link speeds even when utilization nears 100%, where prefetch may cause others to have video outages.

In this example, when UE Z arrives needing 10 Mbps, UE X and Y can detect the change in network condition, namely a 1.25× drop in available bandwidth and can stop prefetching until they receive new insight. In this case, UE X and Y may have already prefetched many seconds and so can stop without immediate problems. Thus, for a limited time UE Z can immediately get almost the entire 10 Mbps, instead of getting only about 3 Mbps, for example for the 1st minute.

In this example, UE X and Y may stop prefetching about one minute faster than based on knowledge server insight alone, thereby avoiding any knowledge server discovery/notification delay.

If a buffer depletes, UE X and UE Y can each resume at 0.5 and 3 Mbps respectively. Moreover, UE X and Y can wait and see if rates double. If rates double, UE X & Y can resume prefetching, due to the rate doubling. This may occur as soon as UE Z departs or stops such heavy usage.

Certain embodiments may have various benefits and/or advantages. For example, in certain embodiments, a knowledge server can serve insights to applications. The served insights can provide a further mechanism for allowing the networking insights to be as fresh/appropriate as possible, while avoiding imposing huge costs on the wireless network. Having fresh/appropriate insights can permit a host of significant benefits, and can avoid, for example, prefetching continuing for about one minute into a one minute loading spike after a scoring event in a stadium. This mechanism can be practiced in an application that uses these insights in combination with an application ability to detect certain local environment variables such as link speed.

Figure 11:
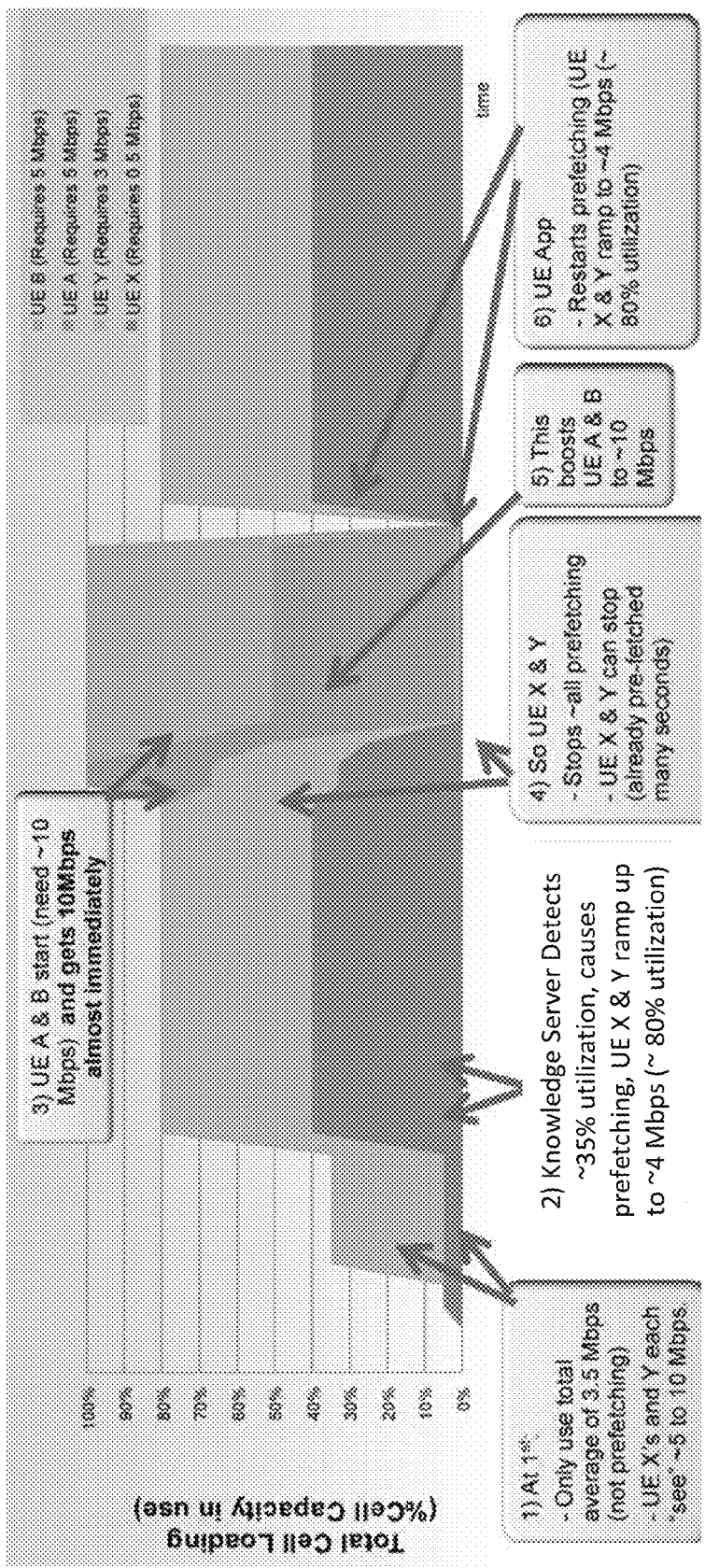
FIG. 11 illustrates an example of knowledge server insight applied with application detection of network conditions, according to certain embodiments.

FIG. 11 illustrates an example of knowledge server insight applied with application detection of network conditions, according to certain embodiments. As shown in FIG. 11, at 1, at first a cell may use a total of 3.5 Mbps, not including any prefetching. Meanwhile the UEs may see from about 5 to 10 Mbps. A knowledge server can, at 2, detect that utilization is about 35% and can cause prefetching, leading each of UE X and Y to ramp up to about ~4 Mbps, yielding ~80% utilization. Then, at 3, UE A and B can each arrive in the cell, needing about 10 Mbps, and get this almost immediately. At 4, UE X and Y can stop nearly all data usage, because they have already fetched many seconds of data, when they detect the increased usage of the network, perhaps by detecting a change in latency or link speed. At 5, the reduced usage by X and Y can allow UE A to get its full amount of data. Then, as UE A stops its usage UE B can get its desired bandwidth and then also stop. At 6, UEs X and Y can ramp up to about 4 Mbps again, based on detecting a positive change in data rate, or the like. Meanwhile, the knowledge server does not need to get involved.

In certain cases, the link speed can be directly detected by an application. For example, HTTP adaptive video streaming applications may monitor the link speed achieved by each section of video, and then use this information to influence what compression level is used for the next section of video. Other ways of determining changes to an environment, such as changes to the network activity, changes to the location of the user equipment, or changes to a venue associated with the user equipment, are also permitted.

Figure 13:
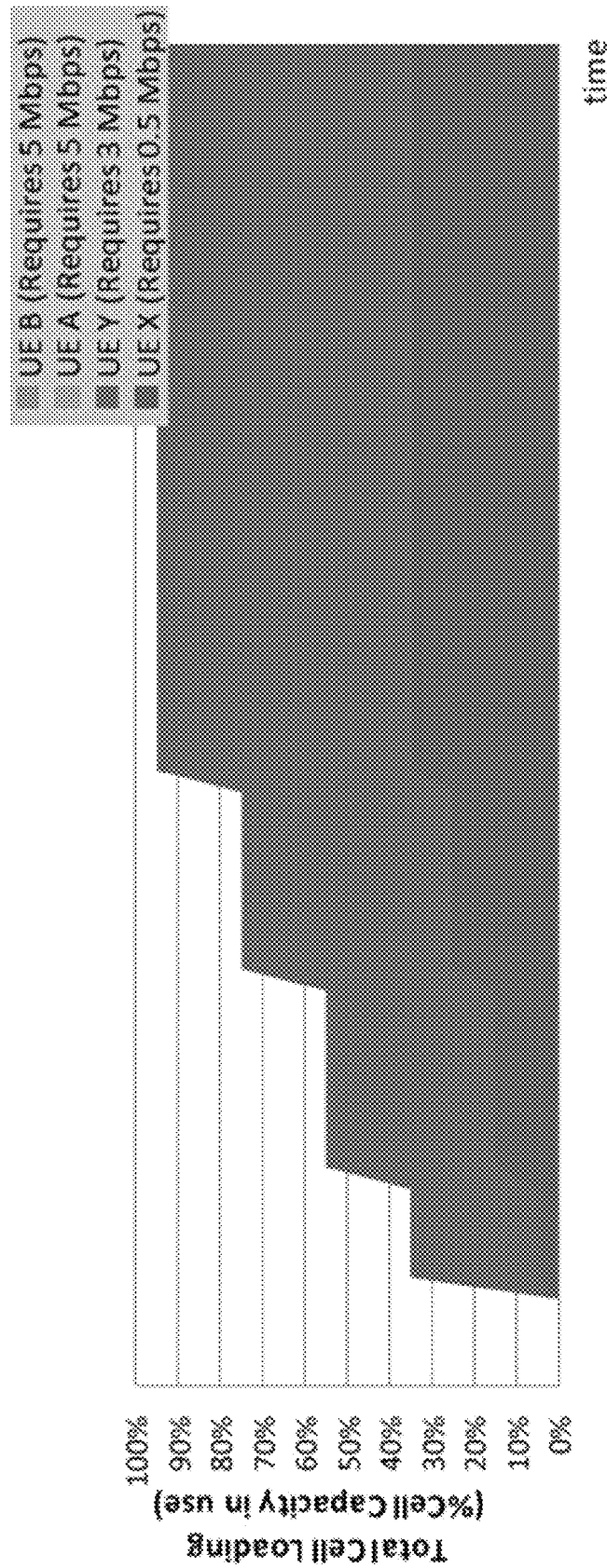
FIG. 13 illustrates a ramping insight according to certain embodiments.

FIG. 13 illustrates a ramping insight according to certain embodiments. As shown in FIG. 13, at an initial point user equipment may be provided with insight that can encourage them to begin prefetching immediately, but to limit the prefetching. The insight can also explicitly or implicitly encourage the user equipment to continue ramping up prefetching at regular or irregular intervals until a maximum condition is met. For example, the ramping may be designed to avoid a condition where over 95% utilization is achieved.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

ASA Authorized Shared Access
ASIC Application Specific Integrated Circuit
CEM Customer Experience Management
CQI Channel Quality Indicator
CPU Central Processing Unit
CSP Communication Service Provider or Customer Service Provider
DSP Digital Signal Processor
eNB evolved Node B
FPGA Field Programmable Gate Array
HDD Hard Disk Drive
KS Knowledge Server
LAU Location Area Update
O&M Operations and Maintenance
PLD Programmable Logic Device
RAM Random Access Memory
RAU Reporting Area Update
RET Remote Electrical Tilt
RF Radio Frequency
RRC Radio Resource Control
RSRQ Reference Signal Received Quality
RSRP Reference Signal Received Power
TAU Tracking Area Update
UE User Equipment
URL Uniform Resource Locator

We claim:

1. A method, comprising:
adjusting functionality of an application of a user equipment, based on a first network insight received from a network element, wherein the first network insight comprises an indication of availability of acceleration of the application;
determining at least one environmental condition corresponding to the user equipment;
monitoring the at least one environmental condition;
readjusting the functionality of the application when the at least one environmental condition meets a predetermined condition, wherein the predetermined condition comprises at least one threshold being exceeded with respect to the at least one environmental condition, wherein the readjusting comprises discontinuing or reducing prefetching;
further monitoring the at least one environmental condition; and
further readjusting the functionality of the application when the at least one environmental condition meets a second predetermined condition.

2. The method of claim 1, wherein the network element comprises a knowledge server.

3. The method of claim 1, wherein the first network insight comprises an indication of whether to perform prefetching.

4. The method of claim 1, wherein the environmental condition comprises at least one of an audio level, a network latency, a network speed, or a network packet loss.

5. The method of claim 1, wherein the readjusting comprises applying a second network insight different from the first insight.

6. The method of claim 1, further comprising:
storing the at least one environmental condition, wherein the monitoring comprises comparing a current environmental condition to the at least one environmental condition.

7. The method of claim 1, further comprising:
determining a third network insight; and
readjusting the functionality of the application based on the third network insight.

8. The method of claim 1, wherein the second predetermined condition comprises the at least one threshold not being exceeded with respect to the at least one environmental condition.

9. The method of claim 8, wherein the increasing prefetching is performed periodically in increments.

10. The method of claim 1, wherein the further readjusting comprises restoring or increasing prefetching.

11. The method of claim 1, wherein the predetermined condition comprises at least one threshold not being exceeded with respect to the at least one environmental condition.

12. The method of claim 11, wherein the readjusting comprises increasing prefetching.

13. A method, comprising:
monitoring network service viability for a user or application;

sending a push message to a user equipment when network service viability is detected for the application, wherein the push message indicates at least one threshold associated with the network service viability, wherein the push message comprises an indication of availability of acceleration of the application, wherein the at least one threshold is related to at least one environmental condition, wherein the at least one environmental condition comprises at least one of an audio level, a network latency speed, or a network packet loss;

further monitoring the network service viability for the application; and sending a further push message when a change to the network service viability is detected.

14. An apparatus, comprising:

at least one processor; and at least one memory including computer program code, wherein the at least one memory and the computer program code are configured to, with the at least one processor, cause the apparatus at least to adjust functionality of an application of a user equipment, based on a first network insight received from a network element, wherein the first network insight comprises an indication of availability of acceleration of the application;

determine at least one environmental condition corresponding to the user equipment;

monitor the at least one environmental condition;

readjust the functionality of the application when the at least one environmental condition meets a predetermined condition, wherein the predetermined condition comprises at least one threshold being exceeded with respect to the at least one environmental condition, wherein the readjustment comprises discontinuing or reducing predicting;

further monitor the at least one environmental condition; and further readjust the functionally of the application when the at least one environmental condition meets a second predetermined condition.

15. An apparatus, comprising:

at least one processor; and at least one memory including computer program code, wherein the at least one memory and the computer program code are configured to, with the at least one processor, cause the apparatus at least to monitor network service viability for a user or application;

send a push message to a user equipment when network service viability is detected for the application, wherein the push message indicates at least one threshold associated with network service viability, wherein the push message comprises an indication of availability of acceleration of the application, wherein the threshold is related to at least one environmental condition, wherein the environmental condition comprises at least one of an audio level, a network latency, a network speed, or a network packet loss;

further monitor network service viability for the application; and send a further push message when a change to network service viability is detected.

\* \* \* \* \*